US009665697B2

(12) United States Patent
Bostick et al.

(10) Patent No.: US 9,665,697 B2
(45) Date of Patent: May 30, 2017

(54) SELECTIVELY BLOCKING CONTENT ON ELECTRONIC DISPLAYS

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 14/660,068

(22) Filed: Mar. 17, 2015

(65) Prior Publication Data

US 2016/0275270 A1 Sep. 22, 2016

(51) Int. Cl.
*G06F 7/04* (2006.01)
*G06F 17/30* (2006.01)
*G06F 21/10* (2013.01)
*G06F 3/0481* (2013.01)

(52) U.S. Cl.
CPC ............ *G06F 21/10* (2013.01); *G06F 3/0481* (2013.01); *G06F 17/30705* (2013.01); *G06F 2203/04804* (2013.01); *G06F 2221/0748* (2013.01)

(58) Field of Classification Search
CPC .. G06F 21/31; G06F 3/04883; G06F 3/04886; G06F 21/50; G06F 21/554; G06F 2221/032; G06F 2221/2111; G06F 21/6245; G06F 21/84; G06F 3/1454; G06F 21/604; G02F 1/13306; G02F 1/13338; G02F 1/1347; G02F 2001/133342

USPC ................................................ 726/7, 26, 28
See application file for complete search history.

(56) References Cited

U.S. PATENT DOCUMENTS

| 7,764,291 B1 | 7/2010 | Wang et al. |
| 8,370,947 B2 | 2/2013 | Zaitsev et al. |
| 8,601,561 B1 * | 12/2013 | Cleron .................... G06F 21/31 |
| | | 726/7 |

(Continued)

FOREIGN PATENT DOCUMENTS

| WO | 0193037 A3 | 12/2001 |
| WO | 2012166113 A1 | 12/2012 |

OTHER PUBLICATIONS

Greene, Kate, "Two-Sided Touch Screen", Aug. 24, 2007, MIT Technology Review, © 2014 v1/13/05.10, <http://www.technologyreview.com/news/408562/two-sided-touch-screen/>.

(Continued)

*Primary Examiner* — Gary Gracia
(74) *Attorney, Agent, or Firm* — Bryan D. Wells; David M. Quinn

(57) ABSTRACT

A method for selectively blocking content on a transparent electronic display is provided. Unstructured information is analyzed using natural language processing techniques. A portion of the unstructured information is classified as protected content. An emissive layer displays the protected content over a substantially opaque portion of the selectively transparent layer. A user is provided with a prompt that identifies the protected content. The substantially opaque portion of the selectively transparent layer become substantially transparent in response to receiving an interaction with the prompt from the user.

20 Claims, 6 Drawing Sheets

(56) References Cited

U.S. PATENT DOCUMENTS

| | | | |
|---|---|---|---|
| 8,813,193 B2 | 8/2014 | Kim et al. | |
| 9,058,813 B1* | 6/2015 | Blanksteen | G10L 15/19 |
| 2006/0181769 A1* | 8/2006 | Kumasawa | G03B 21/604 |
| | | | 359/449 |
| 2007/0137079 A1* | 6/2007 | McNeil | G09F 15/00 |
| | | | 40/606.18 |
| 2007/0206156 A1* | 9/2007 | Quach | G03B 21/604 |
| | | | 353/20 |
| 2008/0025645 A1* | 1/2008 | Jakobson | G06F 21/62 |
| | | | 382/300 |
| 2009/0132419 A1* | 5/2009 | Grammer | G06F 21/6245 |
| | | | 705/50 |
| 2009/0231252 A1* | 9/2009 | Maegawa | G06F 21/84 |
| | | | 345/87 |
| 2010/0162410 A1* | 6/2010 | Chudy | G06F 21/10 |
| | | | 726/27 |
| 2011/0289427 A1* | 11/2011 | Toprani | G06F 3/0488 |
| | | | 715/746 |
| 2012/0019434 A1* | 1/2012 | Kuhlman | G02F 1/13306 |
| | | | 345/1.3 |
| 2012/0062443 A1 | 3/2012 | Baldischweiler | |
| 2012/0131471 A1* | 5/2012 | Terlouw | G06F 3/04883 |
| | | | 715/741 |
| 2012/0139956 A1* | 6/2012 | Joseph | G09F 9/30 |
| | | | 345/690 |
| 2012/0218312 A1* | 8/2012 | Goldsmith | G09G 3/3406 |
| | | | 345/690 |
| 2013/0111597 A1* | 5/2013 | Gossweiler, III | G06F 21/556 |
| | | | 726/26 |
| 2013/0265284 A1* | 10/2013 | Yun | G06F 3/0488 |
| | | | 345/175 |
| 2014/0045553 A1* | 2/2014 | Shimada | G06F 3/041 |
| | | | 455/566 |
| 2014/0078089 A1* | 3/2014 | Lee | G06F 3/0488 |
| | | | 345/173 |
| 2014/0139559 A1 | 5/2014 | Yoo et al. | |
| 2014/0189535 A1* | 7/2014 | Simonyi | G06Q 50/01 |
| | | | 715/753 |
| 2014/0192281 A1* | 7/2014 | Smithwick | G02F 1/1313 |
| | | | 349/15 |
| 2014/0201844 A1* | 7/2014 | Buck | G06F 21/50 |
| | | | 726/26 |
| 2014/0259184 A1* | 9/2014 | Hoyer | G06F 21/6245 |
| | | | 726/28 |
| 2014/0313218 A1* | 10/2014 | Lee | G09G 5/10 |
| | | | 345/589 |
| 2015/0042539 A1* | 2/2015 | Avrahami | G06F 3/1446 |
| | | | 345/1.3 |
| 2015/0302621 A1* | 10/2015 | Liu | G06T 11/60 |
| | | | 345/647 |

OTHER PUBLICATIONS

Shoemaker, Garth, B. D., "Single Display Privacyware: Augmenting Public Displays With Private Information", a thesis submitted in partial fulfillment of the requirements for the degree of Master of Science in the School of Computing Science, Simon Fraser University, Nov. 2000, © Garth B. D. Shoemaker 2000.
"About the MBS Transparent Screensaver version 2.3", Monkeybread Software, provided by inventor on Jul. 27, 2014, <http://www.monkeybreadsoftware.de/Software/Transparent.shtml>.
"Planar LookThru Series", provided by inventor on Jul. 27, 2014, <http://www.planar.com/products/transparent-displays/>.
"Selective Background Darkening for a Transparent OLED Display", Disclosed Anonymously, An IP.com Prior Art Database Technical Disclosure, IP.com No. 000215897, IP.com Electronic Publication: Mar. 14, 2012.

\* cited by examiner

ORDER FORM

ITEM: COMPANY Z APPARATUS
QUANTITY: Y
FIRST NAME: JOHN    M.I.: D
LAST NAME: SMITH
CREDIT CARD NUMBER:
XXXX-XXXX-XXXX-XXXX
EXPIRATION DATE
MONTH: XX    YEAR:
SECURITY CODE:
BILLING/SHIPPING ADDRESS:
ADDRESS 1:
ADDRESS 2:
CITY:
STATE:    ZIP CODE:
CLICK HERE TO DISPLAY CREDIT CARD INFORMATION

FIG. 2A

ORDER FORM

ITEM: COMPANY Z APPARATUS
QUANTITY: Y
FIRST NAME: JOHN    M.I.: D
LAST NAME: SMITH
CREDIT CARD NUMBER:
EXPIRATION DATE
MONTH:    YEAR:
SECURITY CODE:
BILLING/SHIPPING ADDRESS:
ADDRESS 1:
ADDRESS 2:
CITY:
STATE:    ZIP CODE:
CLICK HERE TO HIDE CREDIT CARD INFORMATION

FIG. 2B

SELECTIVELY BLOCKING CONTENT ON ELECTRONIC DISPLAYS

BACKGROUND OF THE INVENTION

The present invention relates generally to the field of electronic displays, and more particularly to selectively blocking content on transparent electronic displays.

Advances in materials technology have produced substantially transparent conductors, electrodes, and luminescent materials. These materials can be combined to form, among other devices, substantially transparent organic light emitting diodes (OLEDs). In one example of a transparent OLED, a transparent layer of electroluminescent material is disposed between a transparent anode and a transparent cathode. Depending on the specific material, electroluminescent materials can emit, for example, one of red, green, and blue light. Accordingly, OLEDs having appropriate electroluminescent materials can be arranged on a substantially transparent substrate to form a substantially transparent, full-color OLED display. In general, OLEDs emit light omnidirectionally. Consequently, a person can view content from either side of a transparent OLED display. Transparent OLED displays, in addition to any other form of substantially transparent electronic displays, are referred to as transparent displays hereafter. While transparent displays necessarily include, among other things, anodes, cathodes, electroluminescent materials, and conductors that reflect, refract, or absorb light to various degrees, a transparent display generally permits a user to see through inactive portions of the display.

In general, a transparent display can be used in any application for which a conventional, opaque display is suitable. Transparent displays, however, can also perform functions that opaque displays cannot. For example, some augmented reality systems include transparent displays to provide users with the capability to overlay information about their surroundings on their real-world views of their surroundings.

SUMMARY

According to one embodiment of the present disclosure, a method for selectively blocking content on transparent electronic displays is provided. The method includes analyzing, by one or more computer processors, unstructured information using natural language processing techniques; classifying, by one or more computer processors, a portion of the unstructured information as protected content; displaying, by one or more computer processors, the protected content on a transparent electronic display having an emissive layer and a selectively transparent layer, wherein the emissive layer displays the protected content over a substantially opaque portion of the selectively transparent layer; providing, by one or more computer processors, a prompt to a user, wherein the prompt identifies the protected content; and receiving, by one or more computer processors, an interaction with the prompt from the user and, in response, causing, by one or more computer processors, the substantially opaque portion of the selectively transparent layer to become substantially transparent.

According to another embodiment of the present disclosure, a computer program product for selectively blocking content on transparent electronic displays is provided. The computer program product comprises a computer readable storage medium and program instructions stored on the computer readable storage medium. The program instructions include program instructions to analyze, by one or more computer processors, unstructured information using natural language processing techniques; program instructions to classify, by one or more computer processors, a portion of the unstructured information as protected content; program instructions to display, by one or more computer processors, the protected content on a transparent electronic display having an emissive layer and a selectively transparent layer, wherein the emissive layer displays the protected content over a substantially opaque portion of the selectively transparent layer; program instruction to provide, by one or more computer processors, a prompt to a user, wherein the prompt identifies the protected content; and program instructions to receive, by one or more computer processors, an interaction with the prompt from the user and, in response, cause, by one or more computer processors, the substantially opaque portion of the selectively transparent layer to become substantially transparent.

According to another embodiment of the present disclosure, a computer system for selectively blocking content on transparent electronic displays is provided. The computer system includes one or more computer processors, one or more computer readable storage media, and program instructions stored on the computer readable storage media for execution by at least one of the one or more processors. The program instructions include program instructions to analyze, by one or more computer processors, unstructured information using natural language processing techniques; program instructions to classify, by one or more computer processors, a portion of the unstructured information as protected content; program instructions to display, by one or more computer processors, the protected content on a transparent electronic display having an emissive layer and a selectively transparent layer, wherein the emissive layer displays the protected content over a substantially opaque portion of the selectively transparent layer; program instruction to provide, by one or more computer processors, a prompt to a user, wherein the prompt identifies the protected content; and program instructions to receive, by one or more computer processors, an interaction with the prompt from the user and, in response, cause, by one or more computer processors, the substantially opaque portion of the selectively transparent layer to become substantially transparent.

BRIEF DESCRIPTION OF THE DRAWINGS

FIG. 2A depicts a collection of input fields from the perspective of a user of a transparent electronic display within the computing environment of FIG. 1, in accordance with an embodiment of the present disclosure.

FIG. 2B depicts a collection of input fields from the perspective of a viewer of a transparent electronic display within the computing environment of FIG. 1, in accordance with an embodiment of the present disclosure.

DETAILED DESCRIPTION

Embodiments of the present invention recognize a need to selectively block content on transparent electronic displays. While transparent electronic displays enable a user to view content on a first side of the transparent electronic display and share the content with a viewer on a second side of the display, the user may wish to share some content while preventing the viewer from viewing other content. For example, a transparent electronic display could allow a customer service representative to help a customer fill out an order form. The order form could include information such as descriptions of items, quantities, warranty information, and delivery and/or billing addresses. In general, this information is publicly available and exposing the customer service representative to it raises no security or privacy concerns. The order form, however, could also include private credit card information, such as a credit card number, an expiration date, and a security code. In some cases, the form could also include private identifying information such as a social security number. This information is generally private and/or confidential. Accordingly, the customer may not wish to expose it to the customer service representative. If a conventional transparent display is between the customer and the customer service representative, the conventional transparent display does not prevent the customer service representative from viewing this information. In this example, the customer is the user and the customer service representative is the viewer.

Embodiments of the present disclosure provide information security logic that, when executed on a transparent display having a selectively transparent layer, enables a user to view content on a first side of the display and selectively block transmission of the content to a viewer on a second side of the display. In general, the information security logic governs the transparency of a selectively transparent layer that is interposed between an emissive layer and a protective layer. In one example, the information security logic governs the orientations of liquid crystals in a liquid crystal matrix of the selectively transparent display. Based on the type of content being displayed, the information security logic orients the liquid crystals to prevent transmission of light from the emissive layer to one or more portions of the second side of the transparent display. Consequently, one or more regions of the transparent display appear opaque to viewer(s) on the second side of the transparent display. In the context of the present disclosure, transmission refers to the ability of a material to permit light to pass through it. The use of words such as transmission and transmit do not imply that a person is the recipient of the light.

Figure 1:
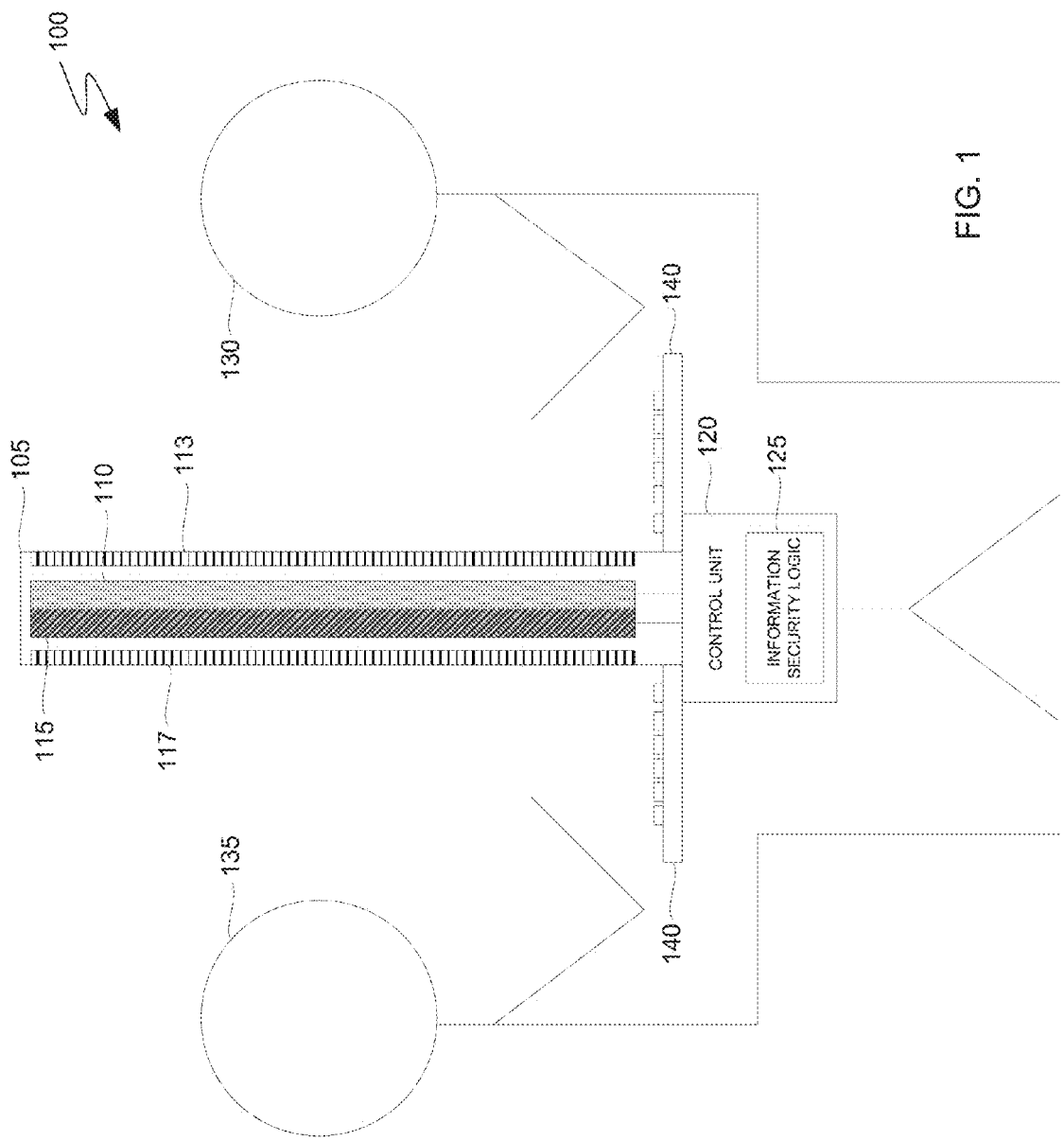
FIG. 1 is a functional block diagram illustrating a computing environment, in accordance with an embodiment of the present disclosure.

The present disclosure will now be described in detail with reference to the Figures. FIG. 1 is a functional block diagram illustrating computing environment 100. Computing environment 100 includes transparent display 105, user 130, and viewer 135. User 130 sees content on a first side of transparent display 105 and viewer 135 sees content on a second side of transparent display 105. Transparent display 105 displays content such that the content is viewable from either the first side or the second side of the display. Transparent display 105 can include OLEDs, optical wave guides, beam splitters, or another display technology that makes content viewable from the first and second sides of the display. In FIG. 1, for example, transparent display 105 includes emissive layer 110. Emissive layer 110 includes a plurality of OLEDs connected to a transparent substrate. In some embodiments, emissive layer 110 includes red, blue, and green OLEDs and displays content in full-color. In the embodiment depicted in FIG. 1, both of user 130 and viewer 135 can see content from emissive layer 110 as described herein. Viewer 135, however, sees a mirror-image of what user 130 sees (e.g., letters and text appear backwards to viewer 135).

The embodiment depicted in FIG. 1 includes selectively transparent layer 115. Selectively transparent layer 115 is interposed between emissive layer 110 and the second side of transparent display 105. Selectively transparent layer 115 includes, for example, a field of liquid crystals disposed between polarized filters. As discussed herein, control unit 120 adjusts the orientation of the liquid crystals by managing, for example, a plurality of thin-film transistors. Persons of ordinary skill in the art will understand that selectively transparent layer 115 and control unit 120 can utilize techniques to orientate the liquid crystals that are analogous to techniques used in passive-matrix and/or active-matrix liquid crystal displays. In various embodiments, selectively transparent layer 115 is analogous to portions of twisted nematic, in-plan switching, super in-plane switching, or advanced fringe field switching active-matrix liquid crystal displays. In general, however, selectively transparent layer 115 can utilize any technique for preventing transmission of light through some portions of selectively transparent layer 115 while allowing transmission of light through other portions.

The embodiment depicted in FIG. 1 also includes first protective layer 113 that opposes second protective layer 117. First protective layer 113 and second protective layer 117 are substantially transparent. First protective layer 113 forms, at least in part, the first side of transparent display 105. Second protective layer 117 forms, at least in part, the second side of transparent display 105. In the embodiment depicted in FIG. 1, content is transmitted from emissive layer 110 to the first side of transparent display 105 through first protective layer 113. Similarly, content is selectively transmitted from emissive layer 110 to the second side of transparent display 105 through selectively transparent layer 115 and second protective layer 117.

In the embodiment depicted in FIG. 1, transparent display 105 includes control unit 120 that forms a bottom portion of transparent display 105. Control unit 120 is electrically connected to emissive layer 110 and selectively transparent layer 115. Control unit 120 causes emissive layer 110 to display content and controls the opacity of various portions of selectively transparent layer 115. Control unit 120 controls the opacity of selectively transparent layer 115 by, at least in part, executing information security logic 125 as discussed hereafter with respect to FIGS. 3 and 5. In some embodiments, information security logic 125 is stored on control unit 120. In other embodiments, information security logic 125 resides on another computing device, provided that control unit 120 can access information security logic 125. In yet other embodiments, information security logic 125 is stored externally and accessed through a communication network, such as a local area network or a wide area network. Control unit 120 can include additional hardware and software as discussed hereafter with respect to FIG. 6.

The embodiment depicted in FIG. 1 includes input devices 140. Input devices 140 are electrically connected to control unit 120. In various embodiments, input devices 140 form part of the structure of transparent display 105, or input devices 140 and transparent display 105 are separate structures. In some embodiments, input devices 140 include one or more workstations, wherein each workstation includes a keyboard, a computer mouse, a track pad, and/or another device for creating or manipulating content for display on transparent display 105. In FIG. 1, for example, input devices 140 include respective keyboards for user 130 and viewer 135. In other embodiments, input devices 140 include one or more touch-sensitive layers (e.g., one or more capacitive sensors) that are electrically connected to control unit 120 and integrated into transparent display 105. Yet other embodiments, include hardware and software (e.g., one or more cameras and/or microphones) to recognize gestures and/or speech for creating or manipulating content for display on transparent display 105. In some of the aforementioned embodiments, viewer 135 is not provided with an input device.

In some embodiments, a second selectively transparent layer is interposed between emissive layer 110 and first protective layer 113, wherein control unit 120 can prevent transmission of light through the second selectively transparent layer based, at least in part, on operation of information security logic 125. In such embodiments, the selectively transparent layers are on opposite sides of emissive layer 110. Person of ordinary skill in the art will understand that the identity of user 130 and viewer 135 is governed by the nature of the content displayed on transparent display 105 and not the position of person(s) relative to transparent display 105. In other words, a person who is user 130 with respect to one selectively transparent layer can be viewer 135 with respect to the other selectively transparent layer, and vice versa, without changing his or her physical position.

FIGS. 2A, 2B, 4A, and 4B are examples of content that can be displayed on transparent display 105, and wherein information security logic 125 has caused selectively transparent layer 115 to block portions of the content from viewer 135 as described herein.

FIGS. 2A and 2B depict examples of input fields in an example of an embodiment wherein order form 200 is displayed on transparent display 105 within computing environment 100 of FIG. 1. FIG. 2A depicts order form 200 from the perspective of user 130. FIG. 2B depicts order form 200 from the perspective of viewer 135. In this example, user 130 is a customer who is filling out order form 200 with his personal information. Viewer 135 is a customer service representative who is helping user 130 fill out order form 200. Order form 200 includes unprotected fields 205 and protected fields 210 that are structured input fields in which user 130 can enter his information.

Unprotected fields 205 prompt user 130 for information that is generally public and/or suitable for viewer 135 to view. For example, unprotected fields 205 include input fields for, among other things, an item name, a quantity, a first name, and a last name. In FIGS. 2A and 2B, user 130 has entered information into a portion of unprotected fields 205. Emissive layer 110 presents and transmits the information to user 130. Operation of information security logic 125 on control unit 120 configures selectively transparent layer 115 to permit transmission of the information from unprotected fields 205 to viewer 135. Viewer 135, however, sees a mirror-image of what user 130 sees. While it may be difficult for viewer 135 to interpret the information (e.g., because English text flows from right to left and the letters are backwards from the perspective of viewer 135), viewer 135 can still follow the progress of user 130 and help user 130 complete the order form.

Protected fields 210, on the other hand, prompt user 130 for information that is generally not public and/or that may not be suitable for viewer 135 to view. For example, protected fields 210 include input fields for credit card information such as a credit card number, an expiration data, and a security code. In FIGS. 2A and 2B, user 130 has entered information to a portion of protected fields 210 as well. Emissive layer 110 presents the information to user 130. Operation of information security logic 125 on control unit 120 configures selectively transparent layer 115 to prevent transmission of the information from protected fields 210 to viewer 135. In other words, the portions of selectively transparent layer 115 that correspond with protected fields 210 become, for example, substantially opaque. In other embodiments, the portions of selectively transparent layer 115 that correspond with protected fields 210 become obfuscated, translucent, form a pattern, or use another technique that makes it difficult or impossible for viewer 135 to accurately interpret information entered into protected fields 210. In addition, control unit 120 causes emissive layer 110 to present information within protected fields 210 such that viewer 130 can discern the information from the background created by a corresponding portion of selectively transparent layer 115. In the embodiment depicted in FIG. 2A, emissive layer 110 presents information within protected fields 210 in a color that is lighter than, and visible against, corresponding portions of selectively transparent layer 115, which are substantially opaque. Accordingly, protected fields 210 are opaque in FIG. 2B and viewer 135 is unable to see information within protected fields 210 without further action from user 130.

In some instances, viewer 135 may need to see information within protected fields 210 to assist user 130, or user 130 may wish for viewer 135 to see the information. Accordingly, operation of information security logic 125 on control unit 120 can notify user 130 that information is not visible to viewer 135 and/or allow user 130 to show viewer 135 information within one or more of protected fields 210. For example, order form 200 includes button 215 that user 130 can activate in order to show viewer 135 information that is within protected fields 210. Activating button 215 causes the portions of selectively transparent layer 115 that correspond with protected fields 210 to become substantially transparent. In the embodiment depicted in FIGS. 2A and 2B, activating button 215 allows viewer 135 to see information within all of protected fields 210. In other embodiments, user 130 can decide which fields of protected fields 210 (e.g., one, all, or any combination of the protected fields) to show viewer 135. In some embodiments, information within protected fields 210 remains visible to viewer 135 for as long as transparent display 105 displays order form 200. In other embodiments, information within protected fields 210 remains visible to viewer 135 for a set amount of time. In various embodiments, user 130 can determine the amount of time and/or the amount of time is determined by information security logic 125.

Figure 3:
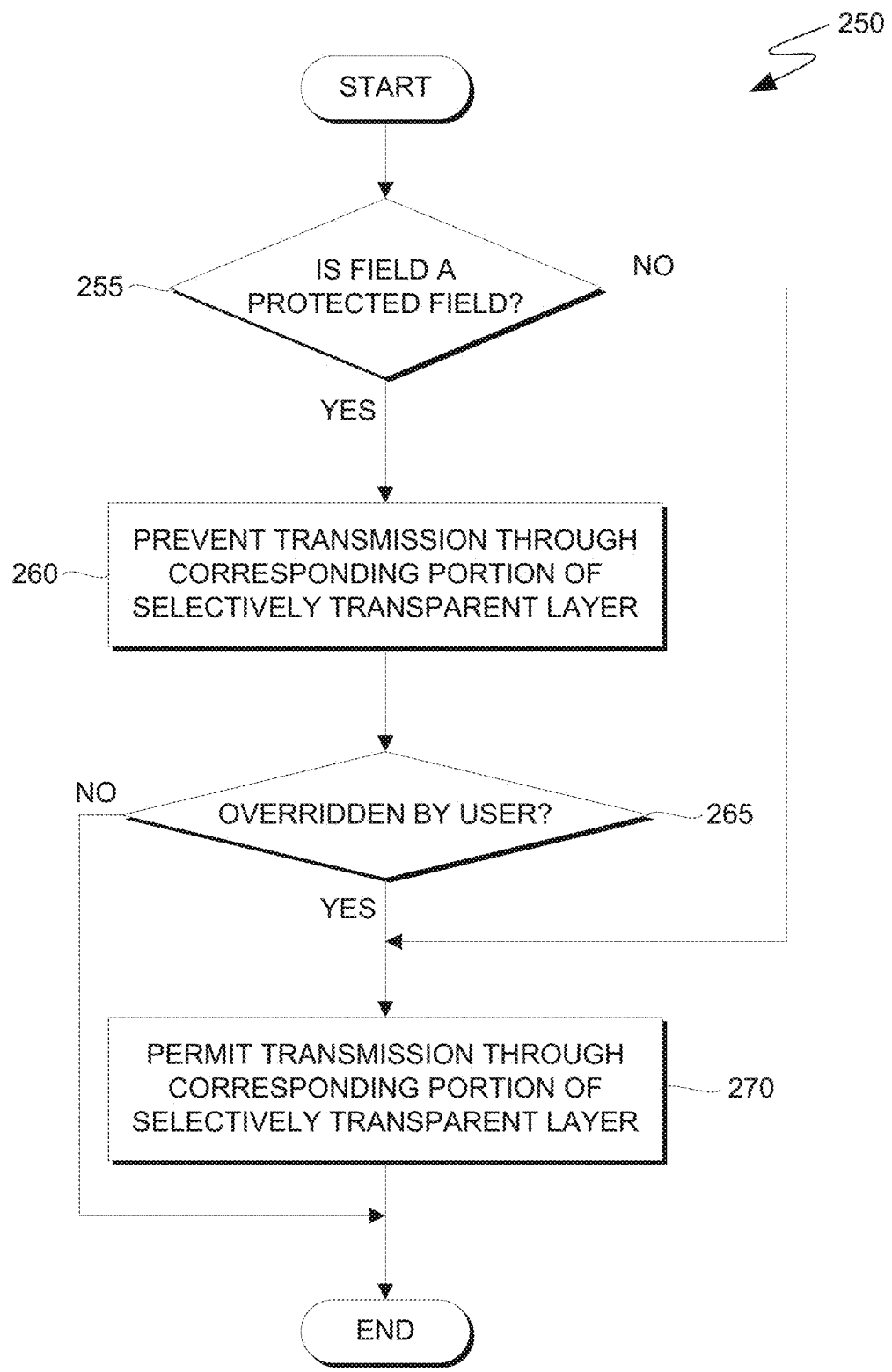
FIG. 3 is a flowchart depicting operations for selectively blocking content within a portion of the input fields of FIGS. 2A and 2B, in accordance with an embodiment of the present disclosure.

FIG. 3 is a flowchart depicting operations 250 of information security logic 125 within computing environment 100, wherein transparent display 105 displays content having structured input fields. In some embodiments, transparent display 105 displays content with one or more input fields that are structured in the sense that a specific type of information is designated for a corresponding input field. For example, the item field of unprotected fields 205 and the credit card number field of protected fields 210 are structured input fields that are designated for specific information (i.e., a name of an item and a credit card number). The data that describes structured input fields can include metadata that identifies a particular field as an input field and as either an unprotected field or a protected field. In such embodiments, control unit 120 executes information security logic 125 to identify input fields as either unprotected fields 205 or protected fields 210 based, at least in part, on metadata. FIG. 3, for example, depicts operations of information security logic 125 for controlling selectively transparent layer 115 in response to content having structured input fields. Information security logic 125 performs an iteration of operations 250 for each input field detected.

In decision 255, information security logic 125 determines if an input field is a protected field based, at least in part, on metadata that describes the input field. If information security logic 125 determines that the input field is a protected field (decision 255, YES branch), information security logic 125 proceeds to operation 260. In other embodiments, information security logic 125 analyzes the metadata using natural language processing techniques as described herein with respect to FIG. 5. Information security logic 125 determines if an input field is protected or unprotected based, at least in part, on the results of natural language analyses in such embodiments.

In operation 260, information security logic 125 configures selectively transparent layer 115 to prevent the transmission of visual information within the input field. For example, information security logic 125 causes the opacity of a portion of selectively transparent layer 115 to increase (or remain constant if already substantially opaque) in response to detecting one of protected fields 210. Information security logic 125 can prevent the transmission of visual information through selectively transparent layer 115 for as long as emissive layer 110 displays the corresponding protected field.

In decision 265, information security logic 125 determines if user 130 has overridden operation 260. For example, information security logic 125 determines that a user has elected to override operation 260 if it determines that the user activated button 215, which is a button that causes transparent display 105 to transmit information within protected fields 210 through selectively transparent layer 115. In other embodiments, information security logic 125 determines if user 130 has overridden operation 260 based, at least in part, on gestures or speech of user 130.

In operation 270, information security logic 125 operates to permit transmission of information through a corresponding portion of selectively transparent layer 115. In response to determining that an input field is not one of protected fields 210 (decision 255, NO branch), information security logic 125 ensures that selectively transparent layer 115 is configured to permit transmission of information within the input field. If, for example, the corresponding portion of selectively transparent layer 115 is opaque prior to operation 270, information security logic 125 reconfigures the corresponding portion to permit transmission of visual information. If the corresponding portion is substantially transparent prior to operation 270, information security logic takes no action to reconfigure selectively transparent layer 115. In response to determining that user 130 has overridden operation 260 (decision 265, YES branch) information security logic 125 reconfigures selectively transparent layer 115 to permit transmission of information within the input field (e.g., information security software decreases the opacity of the input field such that information within it is visible to viewer 135).

Information security logic 125 performs operations 250 for each input field detected in, for example, order form 200.

Figure 4:
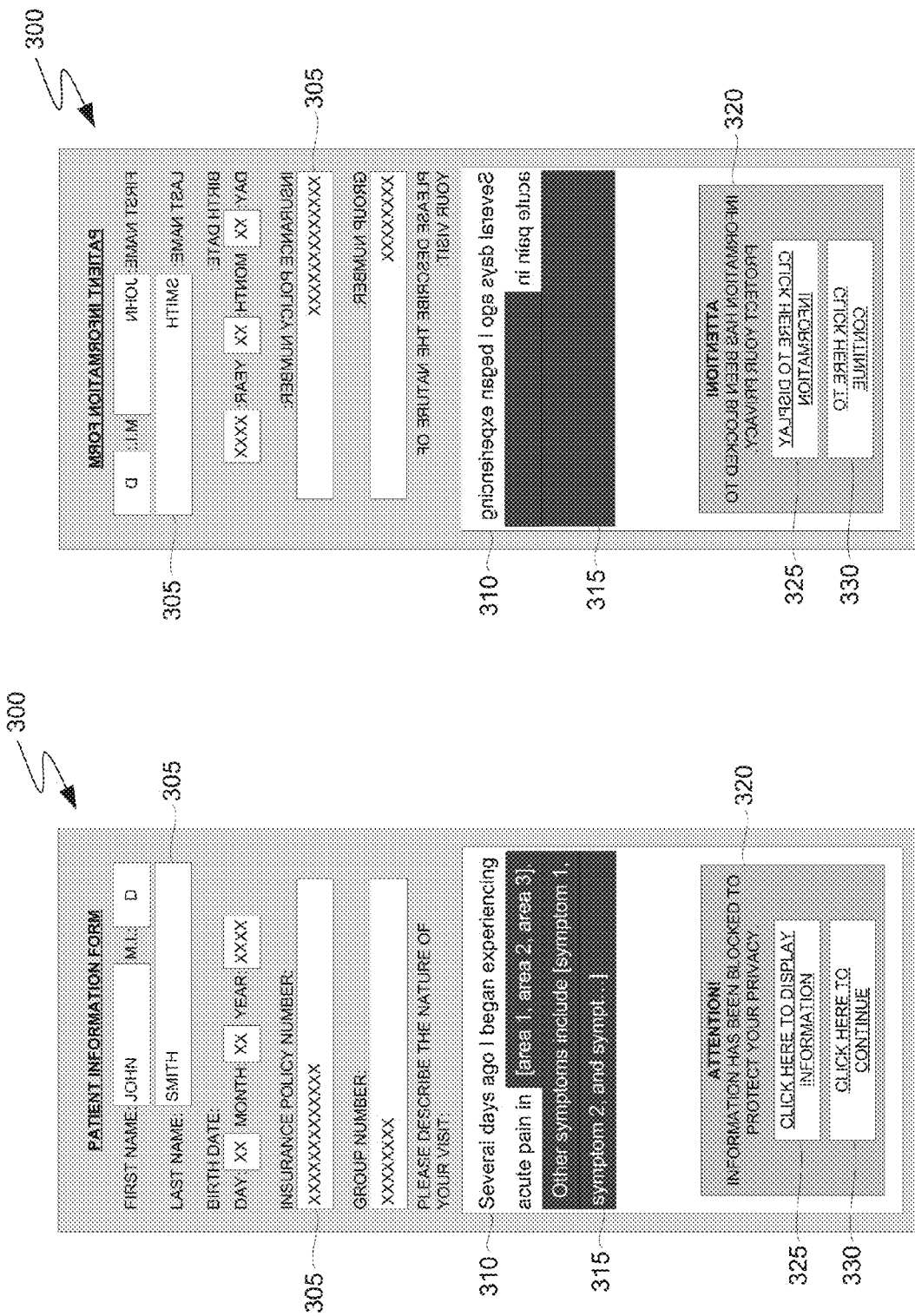
FIG. 4A depicts a collection of input fields from the perspective of a user of a transparent electronic display within the computing environment of FIG. 1, in accordance with an embodiment of the present disclosure.
FIG. 4B depicts a collection of input fields from the perspective of a viewer of a transparent electronic display within the computing environment of FIG. 1, in accordance with an embodiment of the present disclosure.

FIGS. 4A and 4B depict collections of input fields in an example of an embodiment wherein patient information form 300 is displayed on transparent display 105 within the computing environment 100 of FIG. 1. FIG. 4A depicts patient information form 300 from the perspective of user 130. FIG. 4B depicts patient information form 300 from the perspective of viewer 135. In this example, user 130 is a patient who is filling out patient information form 300 with his personal information and information concerning the reason for his visit. Viewer 135 is a healthcare assistant who is helping viewer 130 fill out patient information form 300. Patient information form 300 includes structured input fields 305 that include, for example, a last name field and an insurance policy number field. In various embodiments, structured input fields 305 include unprotected fields and/or protected fields as discussed herein. In patient information form 300, for example, all of structured input fields 305 are unprotected fields, and therefore, visual information within predefined input fields 305 is visible to viewer 135.

Patient information form 300 also includes unstructured text field 310. Unstructured text field 310 is "unstructured" in the sense that it lacks metadata that identifies the type of information within unstructured text field 310. In FIGS. 4A and 4B, for example, user 130 described the time period in which he has experienced acute pain (i.e. "several days"), bodily areas in which he is experiencing acute pain, and other symptoms that he is experiencing. FIGS. 4A and 4B show that information security logic 125 configures selectively transparent layer 115 to permit transmission of certain information and prevent transmission of other information within unstructured text field 310. For example, information security logic 125 configured selectively transparent layer 115 such that viewer 135 can view the information concerning the time period but cannot view information concerning the affected areas or other symptoms. Information security logic 125 configures selectively transparent layer 115 based, at least in part, on whether it classifies information as, for example, "unprotected content" or "protected content." In general, unprotected content is information that is publicly available and/or information that an average person would be willing to share with another person with whom the average person does not have a significant relationship (e.g., as healthcare assistant or secretary). Conversely, protected content is information that is not generally available to the public, information that could harm financial or personal interests if disseminated, or other information that an average person would not be willing to share with another person with whom the average person does not have a significant relationship. In other contexts, protected content is any information that is not necessary for viewer 135 to perform a specific task or function for user 130. As described in greater detail with respect to FIG. 5, information security logic 125 determines if content is protected or unprotected based, at least in part, on one or more ontological repositories and/or repositories of keywords, wherein various words and/or phrases are identified as protected or unprotected content. In some embodiments, information security logic 125 also utilizes one or more rules to classify content as protected or unprotected content as described herein. In FIGS. 4A and 4B, for example, information security logic 125 operates in accordance with rules that allow viewer 135, a healthcare assistant, to see information that viewer 135 needs to know in order to route user 130 to a general practitioner or an appropriate medical specialist. Accordingly, viewer 135 is shown information relating to the urgency of care (e.g., the duration and severity) and a field of medicine (e.g., pain management) so that viewer 135 knows to route user 130 to a pain management specialist and give the patient an appropriate level of priority. Information security logic 125 prevents viewer 135 from seeing the protected content without the consent of user 130 because security logic 125 determines that the protected content is not necessary for viewer 135 to perform the above task.

In the embodiment depicted in FIGS. 4A and 4B, information security logic 125 causes warning 320 to appear if information security logic 125 prevents transmission of information within unstructured text field 310. In FIG. 4A, for example, user 130 is informed that information security logic 125 blocked protected content 315 to protect the privacy of user 130. In addition, user 130 is provided with two options on how to proceed. Button 325 gives user 130 the option to permit transmission of the protected content 315 through selectively transparent layer 115. Accordingly, information security logic 125 acts to cause the opacity or a corresponding portion of selectively transparent layer 115 to decrease if user 130 activates button 325. In some embodiments, information security logic 125 causes transparent display 105 to display a plurality of warnings, wherein a warning is displayed for each type and/or piece of information. In FIG. 4A, for example, information security logic 125 could also cause transparent display 105 to display two warnings, one for the bodily areas in which user 130 is experiencing pain and one for the other symptoms. In yet other embodiments, user 130 is able to manually select protected content within unstructured text field 310 (e.g., highlight a portion of the text using a cursor) for transmission through selectively transparent layer 115. In FIGS. 4A and 4B, user 130 also has the option to activate button 330. Button 330 gives user 130 the option to continue entering information within unstructured text field 310 without overriding information security logic 125. Accordingly, selectively transparent layer 115 continues to prevent transmission of protected content 315 to viewer 135 if user 130 activates button 330. In one embodiment, information security logic 125 removes (i.e., ceases to display) warning 320 if user 130 activates button 330.

Figure 5:
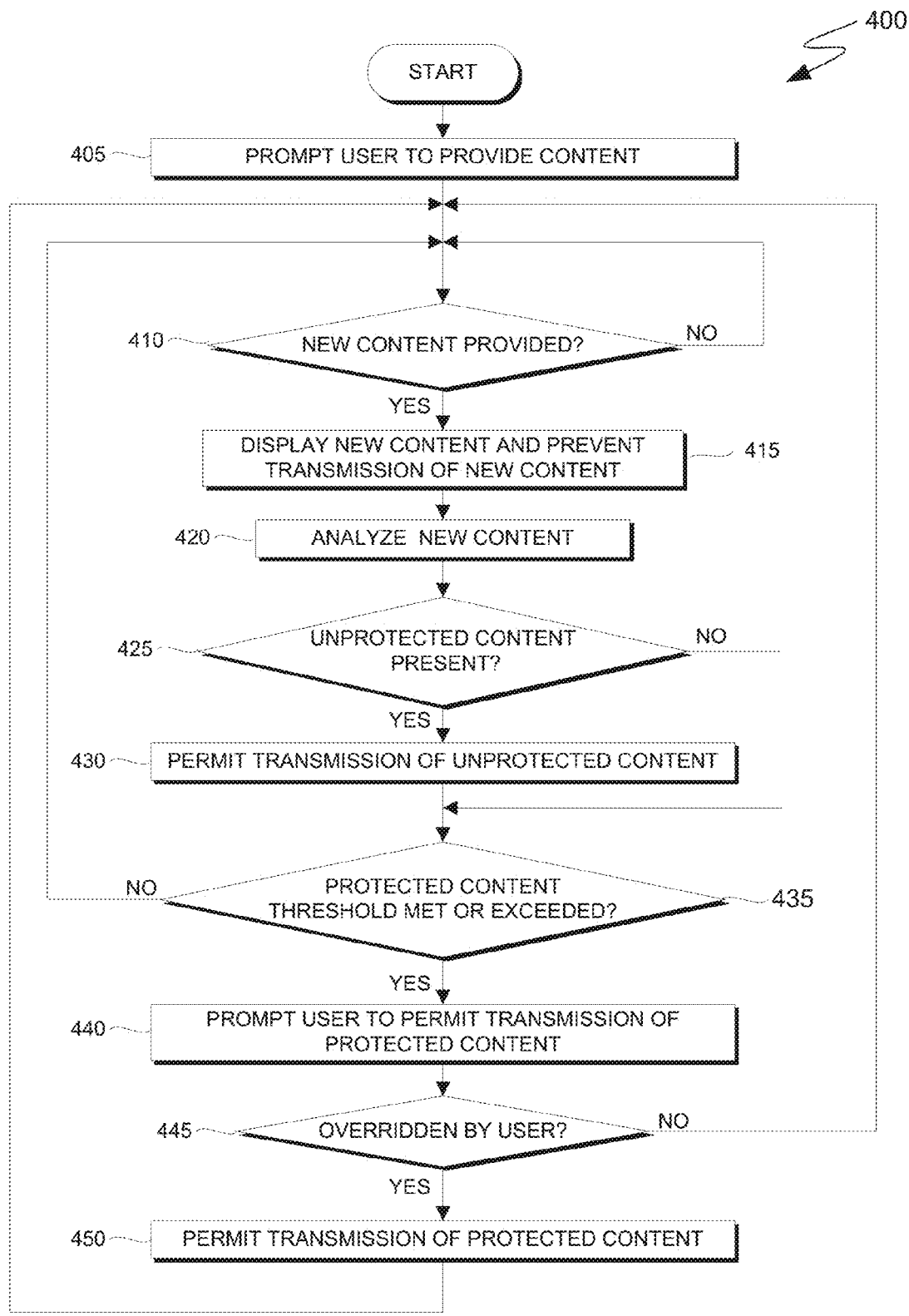
FIG. 5 is a flowchart depicting operations for selectively blocking content within a portion of an input field of FIGS. 4A and 4B, in accordance with an embodiment of the present disclosure.

FIG. 5 is a flowchart depicting operations 400 of information security logic 125 on control unit 120 within computing environment 100, wherein information security logic 125 performs operations relating to an input field for unstructured information (i.e., an unstructured input field).

In operation 405, information security logic 125 prompts a user (e.g., user 130) to provide content for display within an unstructured field (e.g., unstructured text field 310). In various embodiments, the unstructured input field accepts and displays content in the form of text, drawings, video, or another form of content that can be displayed on an electronic display (e.g., transparent display 105). Information security logic 125 prompts the user to provide content using an indicator that modifies the unstructured input field when the field is selected and/or activated. In various embodiments, the indicator is a change in color, size, opacity, or another property of the unstructured input field. In other embodiments, the indicator is a cursor that appears within the unstructured input field. In some embodiments, a combination of indicators prompt user 130 to provide content.

In decision 410, information security logic 125 determines if user 130 provided new content for display in the unstructured input field. New content is any content within the unstructured input field in a first iteration of decision 410 or content that is added to the unstructured input field between iterations of decision 410. Information security logic 125 iterates through decision 410 until user 130 provides new content or the unstructured input field is deactivated. If information security logic 125 determines that new content was provided (decision 410, YES branch), information security logic performs operation 415. If information security logic 125 determines that new content was not provided (decision 410, NO branch), information security logic 125 performs another iteration of decision 410.

In operation 415, information security logic 125 causes emissive layer 110 to display the new content and prevents the transmission of the new content through selectively transparent layer 115. In FIGS. 4A and 4B, for example, information security logic 125 ensures that the portion of selectively transparent layer 115 that corresponds with protected content 315 is opaque. Information security logic 125 causes emissive layer 110 to display the new content so that it is visible to user 130 against the opaque portion of selectively transparent layer 115. In other words, user 130 initially sees the new content displayed over an opaque background. The background becomes transparent or remains opaque in accordance with operations of information security logic 125 as described herein. In some embodiments, information security logic 125 causes portion(s) of selectively transparent layer 115 to become opaque when respective portion(s) of emissive layer 110 display new content. In other embodiments, information security logic 125 configures selectively transparent layer 115 so that all of unstructured text field 310, for example, appears opaque to viewer 135 until information security logic 125 recognizes unprotected content.

In operation 420, information security logic 125 analyzes the content that user 130 provided for display within the unstructured input field. As described herein with respect to FIGS. 4A and 4B, information security logic 125 can classify content within an unstructured input field as unprotected content or protected content. Information security logic 125 can also classify content as indeterminate content. Content is indeterminate content if information security logic 125 cannot classify the content as either protected content or unprotected content above a threshold confidence level. If information security logic 125 does not recognize an incomplete word as a protected or unprotected lemma, for example, the incomplete word is indeterminate content. If the word is completed and/or recognized in a later iteration of operation 420, information security logic 125 classifies the word as protected or unprotected content. Indeterminate content is treated as protected content. Selectively transparent layer does not transmit indeterminate content to viewer 135 absent further actions of user 130.

In general, information security logic 125 uses one or more natural language processing techniques to determine if content within an unstructured input field is protected or unprotected content. Persons of ordinary skill in the art will understand that information security logic 125 classifies content based, at least in part, on predefined rules or rules derived from machine learning algorithms. In various embodiments, the rules can include rules that relate to discourse analysis, morphological segmentation, semantic analysis, sentiment analysis, parsing, lemmatization, or another technique for understanding human language. In addition, information security logic 125 can access one or more ontological repositories and/or repositories of keywords, wherein various words and/or phrases are identified as protected or unprotected content. Persons of ordinary skill in the art will also understand that such repositories can be constructed manually or through supervised, semi-supervised, or unsupervised machine learning of an appropriate corpus of material.

In some embodiments, information security logic 125 uses natural language processing techniques to predict the presence of protected content. The ability of information security logic 125 to predict the occurrence of protected content within an unstructured input field is based, at least in part, on content within the unstructured input field (e.g., unstructured text field 310). In other words, the predictive accuracy of information security logic 125 generally increases as the amount of information within the unstructured input field increases. In some instances, however, information security logic 125 can accurately predict the presence of protected content with relatively little input data. If, for example, user 130 enters "SSN:" within an unstructured input field, it is highly likely that user 120 will subsequently enter a social security number. In some embodiments, information security logic 125 warns user 130 that he or she is about to enter protected content and gives user 130 the option to prevent transmission of the predicted content through selectively transparent layer 115. In other embodiments, information security logic 125 prevents transmission of the predicted content through selectively transparent layer 115 before the predicted content appears within the unstructured input field and subsequently notifies user 130 that the content is protected content (e.g., the embodiment depicted in FIGS. 4A and 4B).

In decision 425, information security logic 125 determines if user 130 provided unprotected content. In one embodiment, the determination is based, at least in part, on the result of operation 420. If information security logic 125 determines that user 130 provided unprotected content (decision 425, YES branch), information security logic 125 performs operation 430. If information security logic 125 determines that user 130 did not provide unprotected content (decision 425, NO branch), information security logic 125 performs decision 435.

In operation 430, information security logic 125 causes selectively transparent layer 115 to permit transmission of the unprotected content. In the embodiment depicted in FIGS. 4A and 4B, for example, information security logic 125 decreases the opacity of a portion of selective transparent layer 115 and changes the color of a respective portion of the text so that viewer 135 can view some of the information (i.e., the unprotected portion of content) within unstructured text field 310 (e.g., the amount of time user 130 has been experience acute pain). Information security logic 125 continues to prevent transmission of other information within free-from text field 310 through selectively transparent layer 115.

In decision 435, information security logic 125 determines if protected content within the unstructured input field meets or exceeds a protected content threshold based, at least in part, on the result of operation 420. In various embodiments, the threshold is based on one or more confidence levels, a count of protected words, a count of logical statements that include protected content, or another parameter relating to protected content within the unstructured input field. In other embodiments, the threshold is a count of seconds that begins when information security logic 125 recognizes protected content or a count of seconds of user inactivity. Yet other embodiments include a combination of thresholds, wherein meeting or exceeding at least one threshold produces an affirmative response to decision 435.

In general, the threshold(s) can be any parameter or combination of parameters that causes information security logic 125 to provide an option for users to override information security logic 125 with an acceptable frequency. If information security logic 125 determines that the protected content threshold is met or exceeded (decision 435, YES branch), information security logic 125 performs operation 440. If information security logic 125 determines that the protected content threshold is not met or exceeded (decision 435, NO branch), information security logic 125 performs another iteration of decision 410. In embodiments where the protected content threshold is based, at least in part, on a count of time, operation 435 causes control unit 120 to execute a subroutine that includes operations 440, 445, and 450 and executes operation 440 if a threshold relating to the count of time is met or exceeded.

In operation 440, information security logic 125 prompts user 130 to permit transmission of protected content through selectively transparent layer 115. In the embodiment depicted in FIGS. 4A and 4B, for example, information security logic 125 causes warning 320 to appear on transparent display 105. Warning 320 provides user 130 with the option to override information security logic 125 and display the protected content (i.e., button 325) or to continue to prevent transmission of the protected and/or indeterminate content to viewer 135 (i.e., button 330). In various embodiments, information security logic 125 prompts user 130 to permit transmission of some or all of the protected content within the unstructured input field. Persons of ordinary skill in the art will understand that protected content within unstructured input field can be organized at varying levels of granularity. Accordingly, information security logic 125 can provide options to override information security logic 125 (e.g., button 325) with respective levels of granularity. In various embodiments, emissive layer 110 displays the option to override information security logic 125 until the user selects an option, the unstructured input field is deactivated, and/or until another condition is satisfied. In some embodiments, user 130 instructs information security logic 125 to permit transmission of the protected content through selectively transparent layer 115 for a limited amount of time. User 130 and/or information security logic 125 can determine the amount of time.

In decision 445, information security logic 125 determines if user 130 elected to override information security logic 125 by, for example, activating button 325. Information security logic 125 determines if user 130 elected to override information security logic 125 based, at least in part, on a signal from at least one of input devices 140. In general, the signal can describe any action of user 130 that is intended to override information security logic. Some embodiment include gesture recognition and/or voice recognition hardware and software that provide one or more signals based on gestures or speech that indicate that user 130 has elected to override information security logic 125. If information security logic 125 determines that user 130 elected to override information security logic 125 (decision 445, YES branch), information security logic 125 performs operation 450. If information security logic 125 determines that user 130 did not elect to override information security logic 125 (decision 445, NO branch), information security logic 125 performs another iteration of decision 410.

In operation 450, information security logic 125 causes selectively transparent layer 115 to permit transmission of the protected content. In the embodiment depicted in FIGS. 4A and 4B, for example, the opaque portions of selectively transparent layer 115 become transparent and emissive layer 110 displays the respective text in a color that is visible against the newly transparent background. Consequently, viewer 135 is able to view, for example, the information concerning the affected areas and additional symptoms of user 130. After performing operation 450, information security logic 125 performs another iteration of decision 410.

Figure 6:
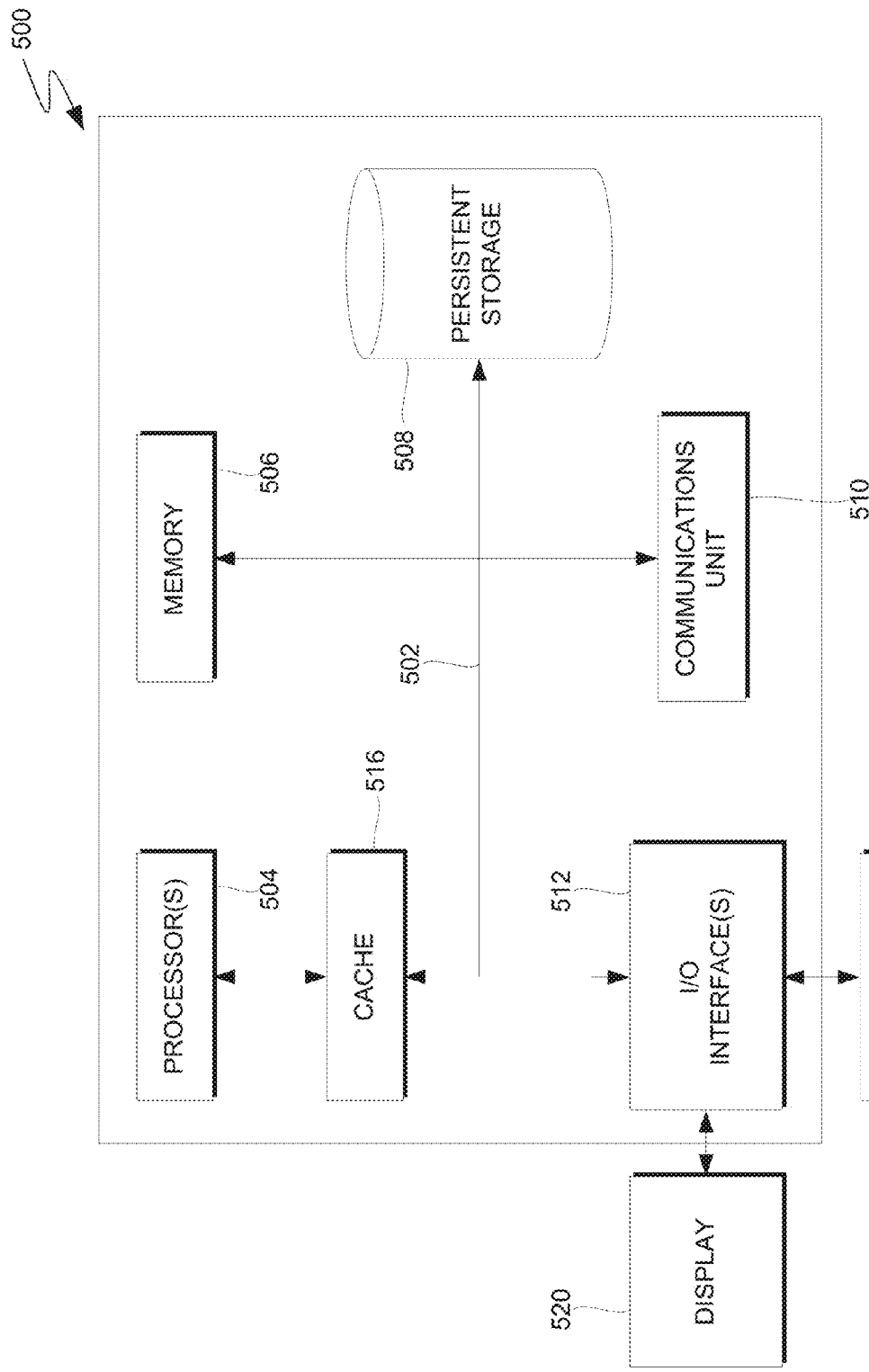
FIG. 6 is a block diagram of components of a computing device executing operations for selectively blocking content on transparent electronic displays, in accordance with an embodiment of the present disclosure.

FIG. 6 depicts computer system 500 that stores and executes information security logic 125 (e.g. control unit 120), in accordance with an embodiment of the present disclosure. Computer system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data and data near accessed data from memory 506.

Program instructions and data used to practice embodiments of the present invention may be stored in persistent storage 508 for execution by one or more of the respective processors 504 via cache 516 and one or more memories of memory 506. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for selectively blocking content on a transparent electronic display having an emissive layer and a selectively transparent layer, the method comprising:
    analyzing, by one or more computer processors associated with the electronic display, unstructured information within an unstructured input field of an interface of the electronic display using natural language processing techniques, wherein the unstructured input field is one of a plurality of input fields;
    classifying, by the one or more computer processors, a portion of the unstructured information as private content;
    displaying, by the one or more computer processors, the private content on the transparent electronic display having the emissive layer and the selectively transparent layer, wherein:
        the emissive layer displays the private content over a substantially opaque portion of the selectively transparent layer;
        the private content is visible over the substantially opaque portion of the selectively transparent layer from a user-side of the emissive layer, and
        the private content is not visible through the substantially opaque portion of the selectively transparent layer from a viewer-side of the emissive layer;
    providing, by the one or more computer processors, a prompt to a user on a user side of the emissive layer, wherein the prompt identifies the private content as private content; and
    receiving, by the one or more computer processors, an interaction with the prompt from the user and, in response, causing, by the one or more computer processors, the substantially opaque portion of the selectively transparent layer to become substantially transparent such that the private content is visible to a viewer on the viewer-side of the emissive layer as a mirror-image of the private content as it is visible to the user on the user-side of the emissive layer.

2. The method of claim 1, wherein the selectively transparent layer includes a plurality of thin-film transistors that manage a plurality of liquid crystals.

3. The method of claim 1, wherein the emissive layer has a plurality of organic light emitting diodes connected to a substantially transparent substrate.

4. The method of claim 3, wherein the selectively transparent layer is a first selectively transparent layer of a plurality of selectively transparent layers that includes a second selectively transparent layer; and wherein the first selectively transparent layer is disposed on the viewer-side of the emissive layer and the second selectively transparent layer is disposed on the user-side of the emissive layer.

5. The method of claim 1, further comprising:
responsive to classifying, by one or more computer processors, a portion of the unstructured information as public content, causing, by the one or more computer processors, a portion of the substantially opaque portion of the selectively transparent layer to become substantially transparent.

6. The method of claim 1, further comprising:
responsive to determining, by the one or more computer processors, that a period of time has elapsed since the interaction with the prompt from the user, returning, by the one or more computer processors, the substantially opaque portion of the selectively transparent layer to a substantially opaque state.

7. The method of claim 1, further comprising:
responsive to classifying, by the one or more computer processors, a structured input field of the plurality of input fields as a private field, displaying, by the one or more computer processors, private content in the structured input field over a second substantially opaque portion of the selectively transparent layer, wherein the second substantially opaque portion of the selectively transparent layer is one of a plurality of substantially opaque portions corresponding to respective input fields of the plurality of input fields.

8. A computer program product for selectively blocking content on a transparent electronic display having an emissive layer and a selectively transparent layer, the computer program product comprising:
a computer readable storage device and program instructions stored on the computer readable storage device, the program instructions comprising:
program instructions to analyze, by one or more computer processors associated with the electronic display, unstructured information within an unstructured input field of an interface of the electronic display using natural language processing techniques, wherein the unstructured input field is one of a plurality of input fields;
program instructions to classify, by the one or more computer processors, a portion of the unstructured information as private content;
program instructions to display, by the one or more computer processors, the private content on the transparent electronic display having the emissive layer and the selectively transparent layer, wherein:
the emissive layer displays the private content over a substantially opaque portion of the selectively transparent layer;
the private content is visible over the substantially opaque portion of the selectively transparent layer from a user-side of the emissive layer, and
the private content is not visible through the substantially opaque portion of the selectively transparent layer from a viewer-side of the emissive layer;
program instruction to provide, by the one or more computer processors, a prompt to a user on a user side of the emissive layer, wherein the prompt identifies the private content as private content; and
program instructions to receive, by the one or more computer processors, an interaction with the prompt from the user and, in response, cause, by the one or more computer processors, the substantially opaque portion of the selectively transparent layer to become substantially transparent such that the private content is visible to a viewer on the viewer-side of the emissive layer as a mirror-image of the private content as it is visible to the user on the user-side of the emissive layer.

9. The computer program product of claim 8, wherein the selectively transparent layer includes a plurality of thin-film transistors that manage a plurality of liquid crystals.

10. The computer program product of claim 8, wherein the emissive layer has a plurality of organic light emitting diodes connected to a substantially transparent substrate.

11. The computer program product of claim 10, wherein the selectively transparent layer is a first selectively transparent layer of a plurality of selectively transparent layers that includes a second selectively transparent layer; and wherein the first selectively transparent layer is disposed on the viewer-side of the emissive layer and the second selectively transparent layer is disposed on the user-side of the emissive layer.

12. The computer program product of claim 8, wherein the program instructions further comprising:
program instruction to, responsive to classifying, by the one or more computer processors, a portion of the unstructured information as public content, cause, by the one or more computer processors, a portion of the substantially opaque portion of the selectively transparent layer to become substantially transparent.

13. The computer program product of claim 8, further comprising:
program instructions to, responsive to determining, by the one or more computer processors, that a period of time has elapsed since the interaction with the prompt from the user, return, by the one or more computer processors, the substantially opaque portion of the selectively transparent layer to a substantially opaque state.

14. The computer program product of claim 8, wherein the program instructions further comprise:
program instruction to, responsive to classifying, by the one or more computer processors, a structured input field of the plurality of input fields as a private input field, display, by the one or more computer processors, private content in the structured input field over a second substantially opaque portion of the selectively transparent layer, wherein the second substantially opaque portion of the selectively transparent layer is one of a plurality of substantially opaque portions corresponding to respective input fields of the plurality of input fields.

15. A computer system for selectively blocking content on a transparent electronic display having an emissive layer and a selectively transparent layer, the computer system comprising:
one or more computer processors;
one or more computer readable storage devices;
program instructions stored on the computer readable storage devices for execution by at least one of the one or more processors, the program instructions comprising:
program instructions to analyze, by one or more computer processors associated with the electronic display, unstructured information within an unstructured input field of an interface of the electronic display using natural language processing techniques, wherein the unstructured input field is one of a plurality of input fields;
program instructions to classify, by the one or more computer processors, a portion of the unstructured information as private content;

program instructions to display, by the one or more computer processors, the private content on the transparent electronic display having the emissive layer and the selectively transparent layer, wherein:
the emissive layer displays the private content over a substantially opaque portion of the selectively transparent layer;
the private content is visible over the substantially opaque portion of the selectively transparent layer from a user-side of the emissive layer, and
the private content is not visible through the substantially opaque portion of the selectively transparent layer from a viewer-side of the emissive layer;
program instruction to provide, by the one or more computer processors, a prompt to a user on a user side of the emissive layer, wherein the prompt identifies the private content as private content; and
program instructions to receive, by the one or more computer processors, an interaction with the prompt from the user and, in response, cause, by the one or more computer processors, the substantially opaque portion of the selectively transparent layer to become substantially transparent such that the private content is visible to a viewer on the viewer-side of the emissive layer as a mirror-image of the private content as it is visible to the user on the user-side of the emissive layer.

16. The computer system of claim 15, wherein the selectively transparent layer includes a plurality of thin-film transistors that manage a plurality of liquid crystals.

17. The computer system of claim 15, wherein the emissive layer has a plurality of organic light emitting diodes connected to a substantially transparent substrate.

18. The computer system of claim 17, wherein the selectively transparent layer is a first selectively transparent layer of a plurality of selectively transparent layers that includes a second selectively transparent layer; and wherein the first selectively transparent layer is disposed on the viewer-side of the emissive layer and the second selectively transparent layer is disposed on the user-side of the emissive layer.

19. The computer system of claim 15, wherein the program instructions further comprise:
program instruction to, responsive to classifying, by the one or more computer processors, a portion of the unstructured information as public content, cause, by the one or more computer processors, a portion of the substantially opaque portion of the selectively transparent layer to become substantially transparent.

20. The computer system of claim 15, further comprising:
program instruction to, responsive to determining, by the one or more computer processors, that a period of time has elapsed since the interaction with the prompt from the user, return, by the one or more computer processors, the substantially opaque portion of the selectively transparent layer to a substantially opaque state.

* * * * *